(12) United States Patent
Ando et al.

(10) Patent No.: US 7,203,044 B2
(45) Date of Patent: Apr. 10, 2007

(54) ELECTRONIC APPARATUS AND POWER SUPPLY CONTROL METHOD

(75) Inventors: Motoaki Ando, Ome (JP); Hiroki Naruse, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 10/321,664

(22) Filed: Dec. 18, 2002

(65) Prior Publication Data

US 2003/0139823 A1 Jul. 24, 2003

(30) Foreign Application Priority Data

Jan. 21, 2002 (JP) ............... 2002-012012

(51) Int. Cl.
*H02H 3/00* (2006.01)

(52) U.S. Cl. ...................... 361/79; 361/93.1

(58) Field of Classification Search .............. 361/79, 361/88, 56, 57, 93.1, 64, 62, 65
See application file for complete search history.

(56) References Cited

U.S. PATENT DOCUMENTS

| | | | | | |
|---|---|---|---|---|---|
| 5,359,540 A | * | 10/1994 | Ortiz | ............ | 700/295 |
| 5,396,635 A | * | 3/1995 | Fung | ............ | 713/323 |
| 5,546,591 A | * | 8/1996 | Wurzburg et al. | ...... | 713/322 |
| 5,675,813 A | * | 10/1997 | Holmdahl | ............ | 713/310 |
| 5,721,934 A | * | 2/1998 | Scheurich | ............ | 713/320 |
| 5,842,027 A | * | 11/1998 | Oprescu et al. | ............ | 713/300 |
| 5,946,180 A | * | 8/1999 | Simpson | ............ | 361/93.3 |
| 6,000,042 A | * | 12/1999 | Henrie | ............ | 714/40 |
| 6,061,746 A | * | 5/2000 | Stanley et al. | ............ | 710/10 |
| 6,064,554 A | * | 5/2000 | Kim | ............ | 361/64 |
| 6,067,628 A | * | 5/2000 | Krithivas et al. | ......... | 713/340 |
| 6,125,455 A | * | 9/2000 | Yeo | ............ | 714/14 |
| 6,147,682 A | * | 11/2000 | Kim | ............ | 345/211 |
| 6,253,329 B1 | * | 6/2001 | Kang | ............ | 713/300 |
| 6,516,418 B1 | * | 2/2003 | Lee | ............ | 713/320 |
| 6,541,879 B1 | * | 4/2003 | Wright | ............ | 307/31 |
| 6,586,849 B2 | * | 7/2003 | Tarr | ............ | 307/38 |
| 6,590,755 B1 | * | 7/2003 | Behr et al. | ............ | 361/62 |
| 6,671,814 B1 | * | 12/2003 | Kubo et al. | ............ | 713/324 |

FOREIGN PATENT DOCUMENTS

| | | |
|---|---|---|
| JP | 10-075523 | 3/1998 |
| JP | 11-243651 | 9/1999 |

\* cited by examiner

*Primary Examiner*—Stephen W. Jackson
(74) *Attorney, Agent, or Firm*—Finnegan, Henderson, Farabow, Garrett & Dunner, L.L.P.

(57) ABSTRACT

There is provided an electronic apparatus including a first interface to which a first device is connectable, a second interface to which a second device is connectable, and a power supply control circuit that controls a current to be supplied to the first and second interfaces. With the above arrangement, the power supply can efficiently be controlled for a plurality of interfaces without increasing the number of power supply control circuits.

10 Claims, 3 Drawing Sheets

ELECTRONIC APPARATUS AND POWER SUPPLY CONTROL METHOD

CROSS-REFERENCE TO RELATED APPLICATIONS

This application is based upon and claims the benefit of priority from the prior Japanese Patent Application No. 2002-012012, filed Jan. 21, 2002, the entire contents of which are incorporated herein by reference.

BACKGROUND OF THE INVENTION

1. Field of the Invention

The present invention relates to an electronic apparatus including a plurality of ports each used for an interface for supplying power to an external device connected thereto, and a power supply control method.

2. Description of the Related Art

Generally, an electronic apparatus such as a personal computer has various interfaces such that it can be connected to an external device (peripheral device) or its functions can be extended. The interfaces include USB, IEEE 1394, and PS/2, which not only transmit/receive data signals to/from an external device connected thereto via a port but also supply power (power supply voltage) from the main body of the electronic apparatus.

To employ an interface that supplies power to an external device, it is necessary to consider the permissible range of a current value and the like defined by the specifications of the interface. In other words, some measures should be taken to avoid the situations in which an external device consumes power (current) the amount of which is not acceptable as a system and a short circuit occurs between a power supply and a ground for some reason.

Exemplary ones of the measures are as follows:

(1) A circuit arrangement in which a signal line and a power line are connected to an interface port to which an external device is connected. A fuse is provided in the power line as a power supply control circuit to limit an amount of current. If a larger amount of current than a predetermined value flows through the power line, the fuse is blown.

(2) A circuit arrangement for turning on/off a power supply using an FET (field effect transistor) switch that is provided in a power line as a power supply control circuit. If a larger amount of current than a predetermined value flows through the power line, the FET switch turns off in response to a control signal.

In order to control the power supply of two ports, the same number of power supply control circuits as that of the ports are required.

According to the specifications of, e.g., USB, at least 500 mA current needs to be consumed to operate respective USB devices. In the circuits, a power supply is controlled for each of ports based on the premise that the current consumed by an external device connected to each of the ports is about 500 mA. In this case, an external device whose current consumption greatly exceeds 500 mA cannot be used.

The problems of the above-described measures are summarized as follows.

A power supply control circuit such as a fuse and an FET switch for controlling a power supply has to be provided for each port. Accordingly, the total number of circuits increases and so does the packing area.

To particularly support an external device that requires a great amount of power for operation, the number of circuits increases markedly and so does the packing area. The larger the number of types of interface and the number of ports, the much larger the size of the circuit.

In the field of electronic apparatus that requires lightness, thinness, shortness and smallness, it is not desirable to increase the number of power supply control circuits used for interfaces.

BRIEF SUMMARY OF THE INVENTION

Embodiments of the present invention provide an electronic apparatus capable of efficiently controlling a power supply for a plurality of interfaces without increasing the number of power supply control circuits and a power supply control method.

According to one aspect of the present invention, there is provided an electronic apparatus, comprising a first interface to which a first device is connectable externally; a second interface to which a second device is connectable externally; and a power supply control circuit configured to control power to be supplied to the first and second interfaces.

According to another aspect of the present invention, there is provided an electronic apparatus, comprising a first interface to which a first device is connectable externally; a second interface to which a second device is connectable externally; a power supply control circuit configured to control a current to be supplied to the first and second interfaces; and a controller configured to control supplying/stopping power to the power supply control circuit in accordance with a power supply state of the electronic apparatus, wherein the power supply control circuit issues a signal indicative of an overcurrent to the controller when a sum of currents consumed by the first and second interfaces exceeds a predetermined value, and the controller supplies the power supply control circuit with a signal to give an instruction to stop a power supply to the first and second interfaces in response to the signal indicative of the overcurrent.

According to still another aspect of the present invention, there is provided a power supply control method for an electronic apparatus including a first interface to which a first device is connectable and a second interface to which a second device is connectable, the method comprising supplying a current from a single power supply control circuit to the first and second interfaces; and controlling a current to be supplied to the first and second interfaces by the single power supply control circuit.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
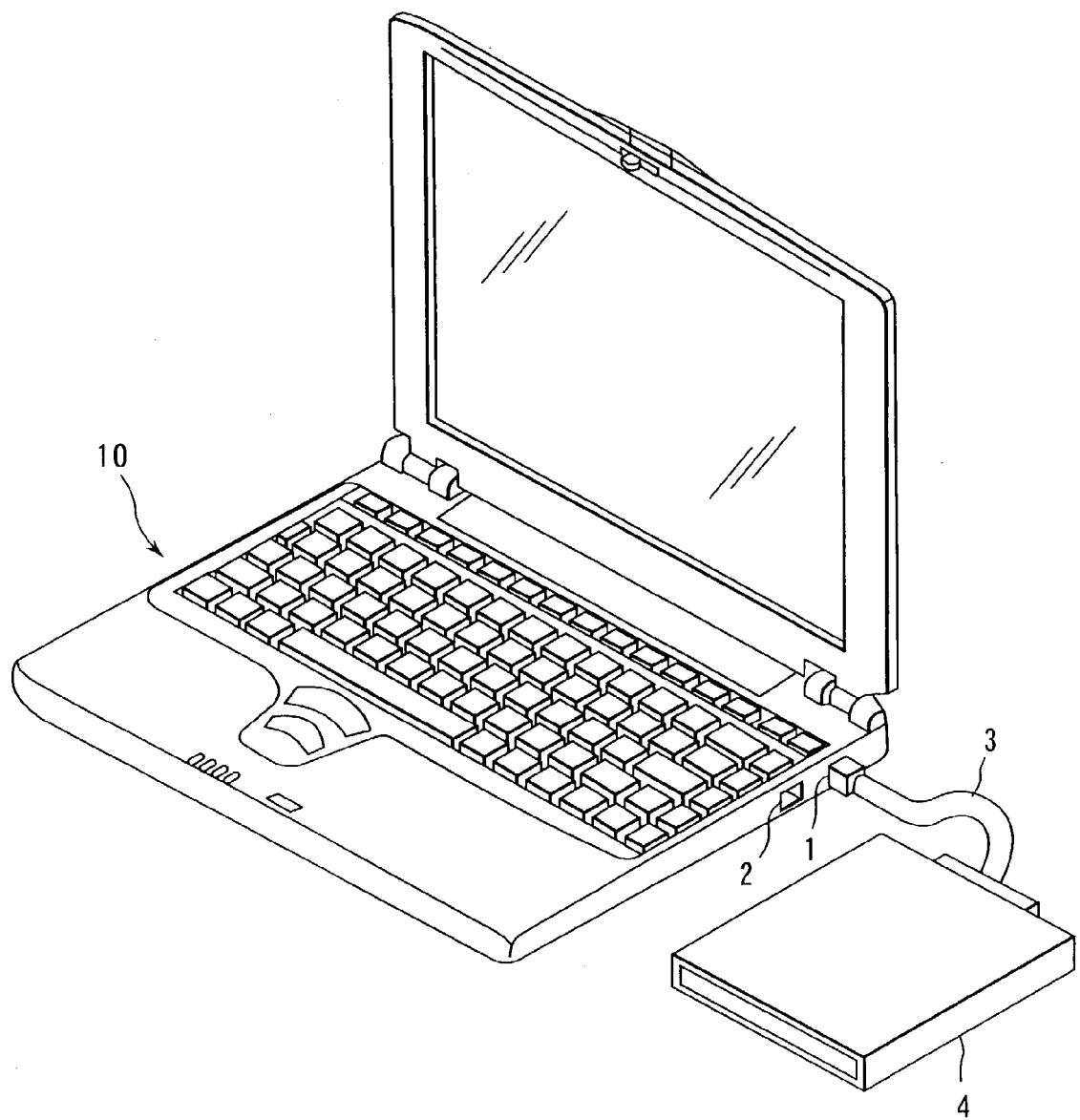
FIG. 1 is a perspective view showing an outward appearance of an electronic apparatus according to an embodiment of the present invention.

FIG. 1 is a perspective view showing an outward appearance of an electronic apparatus according to the embodiment of the present invention.

An electronic apparatus 10 according to the present embodiment is, for example, a personal computer (PC) and includes various interfaces such that it can be connected to an external device (peripheral device) or its functions can be extended. As shown in FIG. 1, the electronic apparatus 10 includes two USB interfaces (interface ports 1 and 2) that conform to the USB (universal series bus) standards, and an external device (e.g., FDD) 4 that conforms to the USB standards is connected to the port 1 through a cable 3 with a connector.

Figure 2:
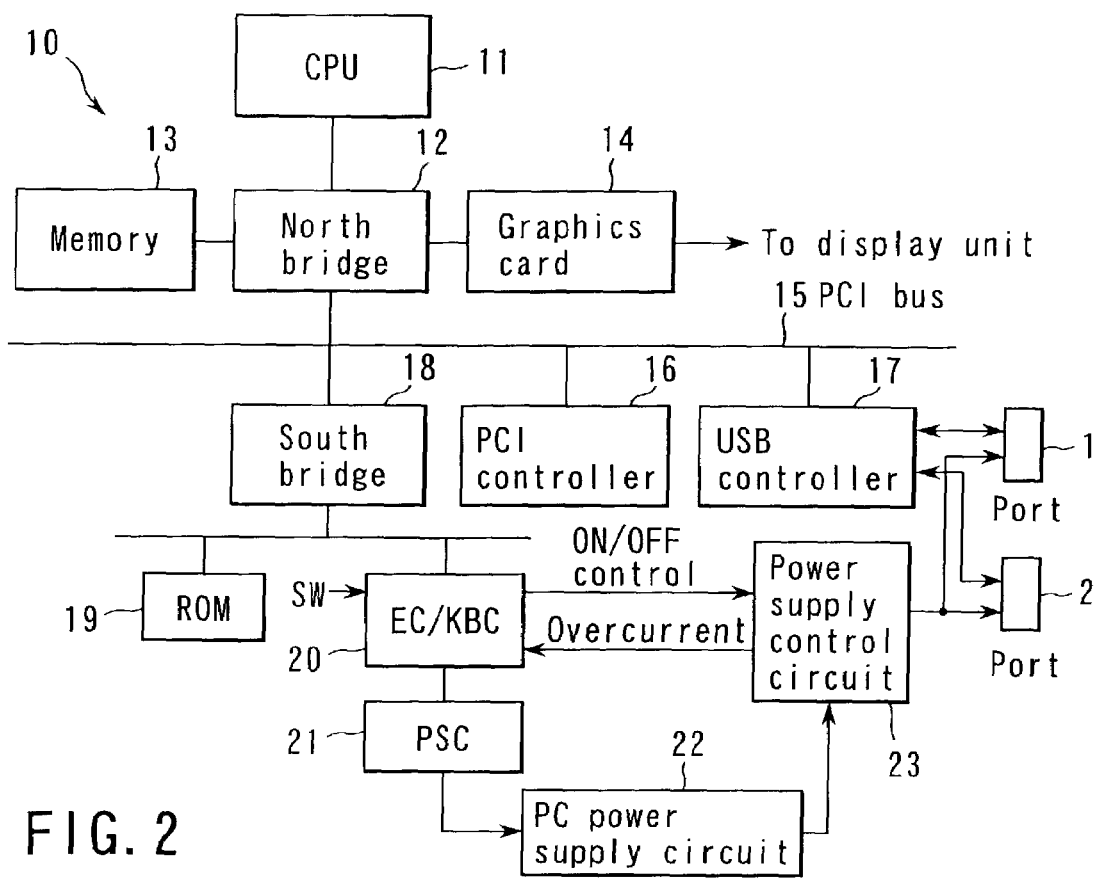
FIG. 2 is a block diagram showing an internal configuration of the electronic apparatus shown in FIG. 1.

FIG. 2 is a block diagram showing an internal configuration of the electronic apparatus 10.

The electronic apparatus 10 includes a CPU 11, a north bridge 12 a memory 13, a graphics card 14, a PCI (peripheral component interconnect) bus 15, a PCI controller 16, a USB controller 17, a south bridge 18, a ROM 19, an EC/KBC 20, a power supply controller (PSC) 21, a PC power supply circuit 22, and a power supply control circuit 23 as well as the above-described ports 1 and 2.

The CPU 11 controls the whole operation of the electronic apparatus 10 to process data and execute various programs with the other devices in the apparatus 10.

The north bridge 12 includes various controllers to execute bridge processing between the CPU 11 and south bridge 18, control the memory 13 and the graphics card 14, etc.

The memory 13 holds an OS (operating system) to be processed by the CPU 11, various drivers, various applications, and the like. The memory 13 serves as a work area of the CPU 11.

The graphics card 14 is connected to the north bridge 12 via an AGP (accelerated graphics port) to control data to be displayed on a display.

The PCI bus 15 is provided between the north bridge 12 and south bridge 18. The PCI controller 16 and USB controller 17 are connected to the PCI bus 15.

The PCI controller 16 is connected to the PCI bus 15 to control the processing executed through the PCI bus.

The USB controller 17 is connected to the PCI bus 15 and each of the ports 1 and 2 through a signal line. The USB controller 17 processes data on the basis of the USB standards between the CPU 11 and an external device connected to the USB controller 17 via each of the ports 1 and 2. The USB controller 17 can be connected to the south bridge 18 in place of the PCI bus 15.

The south bridge 18 is connected to the north bridge 12 via the PCI bus 15 and also to the ROM 19 and EC/KBC 20. The south bridge 18 has various controllers for controlling the respective devices.

The ROM 19 stores various items of information for setting the system.

The EC/KBC 20 is a combination of an embedded controller (EC) and a keyboard controller (KBC) in one piece. In particular, the embedded controller (EC) has a function of not only instructing the power supply controller (PSC) 21 to supply/stop power in accordance with the power supply states (on/off states of power supply switch SW, etc.) of the main body of the electronic apparatus 10, but also supplying the power supply control circuit 23 with a signal to give an instruction to stop the supply of power to the two USB interfaces (ports 1 and 2) in response to a signal indicative of an overcurrent from the circuit 23.

The power supply controller (PSC) 21 supplies/stops necessary power to the PC power supply circuit 22 in response to an instruction from the embedded controller (EC).

The PC power supply circuit 22 generates a voltage to be applied to the respective sections of the electronic apparatus (PC) 10 based on the power supplied from the power supply controller (PSC) 21 and applies a predetermined voltage (e.g., 5V) to, for example, the power supply control circuit 23.

The power supply control circuit 23 controls the currents (or power) consumed by the two USB interfaces (ports 1 and 2) or the external devices connected thereto via power lines while supplying power (voltage of, e.g., 5V) to the external devices. In other words, the power supply control circuit 23 stops the supply of power when the sum of the currents (or power) consumed by the two USB interfaces (ports 1 and 2) exceeds a predetermined value. More specifically, the power supply control circuit 23 monitors the currents (or power) consumed by the ports 1 and 2. When the sum of the consumed currents (or power) exceeds a predetermined value, the circuit 23 issues a signal indicative of an overcurrent to the EC/KBC 20 or the embedded controller (EC) thereof and stops the supply of power in response to an instruction signal that is transmitted in response to the issued signal.

The power supply control circuit 23 is formed of a one-chip integrated circuit (IC). The internal configuration of the circuit 23 can be simplified using an element such as an FET.

Figure 3:
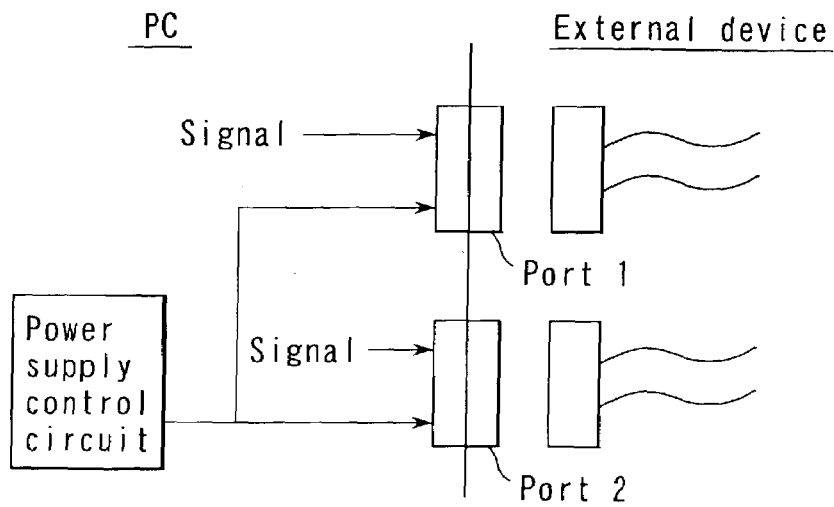
FIG. 3 is a diagram showing a circuit for power supply control of a plurality of interface ports.

FIG. 3 is a diagram showing a circuit for power supply control of a plurality of interface ports.

As illustrated in FIG. 3, the power supply control of the plurality of interfaces (ports 1 and 2) is performed by a single power supply control circuit in the present embodiment. In this case, the currents flowing through the respective ports are not controlled separately but the sum of currents consumed by the ports is controlled. For this reason, the size of the circuit of the present embodiment can be reduced to about half that of the prior art circuit.

In the present embodiment, the sum of currents consumed by the external devices connected to the two ports 1 and 2 is controlled so as not to exceed, for example, 1.2A based on the premise that the maximum permissible range of the consumed currents is $1A+\alpha$ ($=500$ mA$+500$ mA$+\alpha$). Therefore, when only one port is used, an external device whose current consumption is large (ranging from 500 mA to 1.2 A) can be connected to the port.

Figure 4:
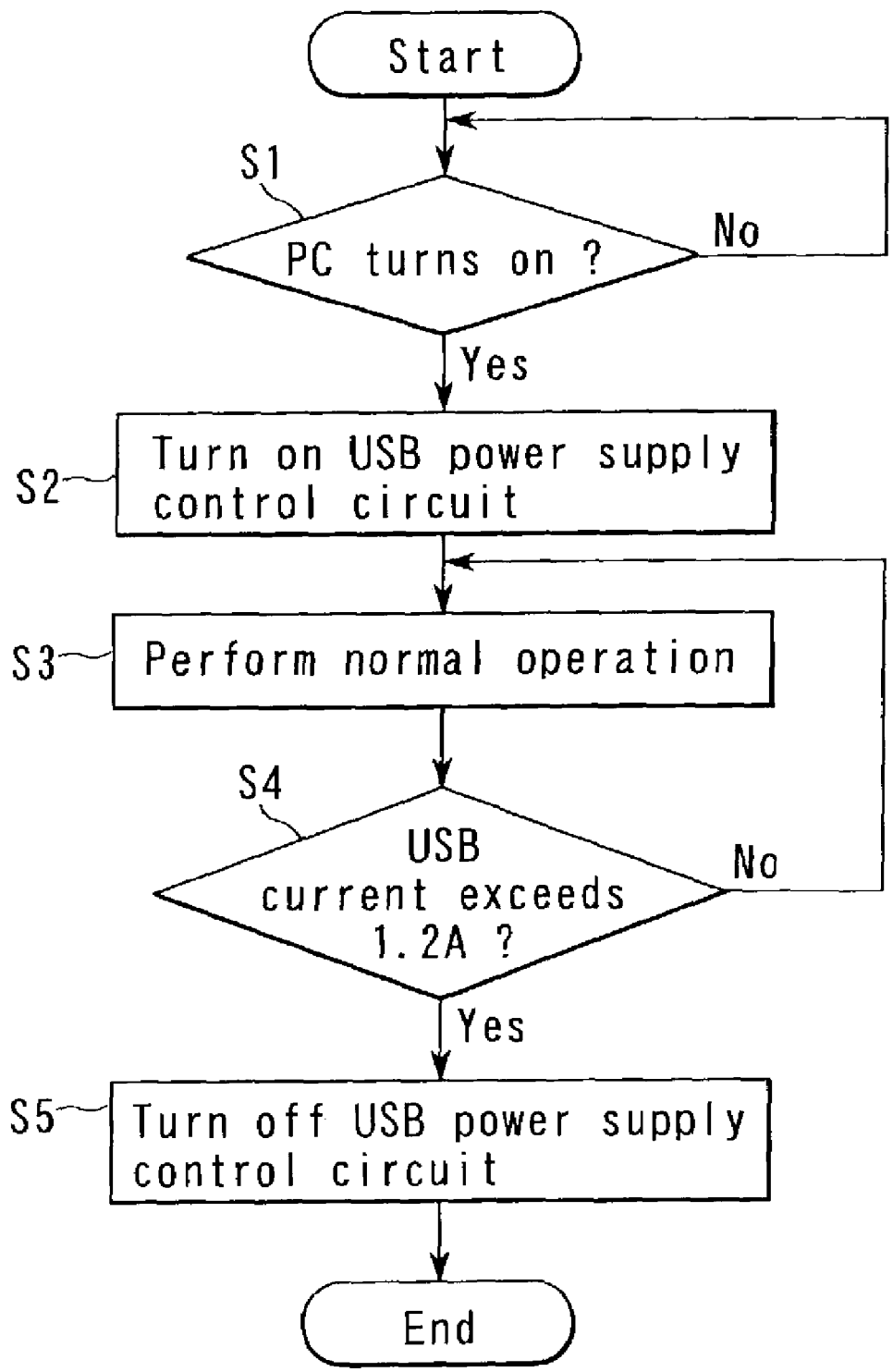
FIG. 4 is a flowchart showing an operation of power supply control of a plurality of interface ports.

An operation of power supply control of the plurality of interface ports in the present embodiment will now be described with reference to the flowchart shown in FIG. 4.

The embedded controller (EC) of the EC/KBC 20 determines whether the power supply of the main body of the electronic apparatus 10 (PC) turns on due to the ON operation of the power supply switch SW (step S1).

When the embedded controller (EC) detects that the power supply turns on, it instructs the power supply controller (PSC) 21 to supply power. Thus, the power supply controller (PSC) 21 supplies necessary power to the PC power supply circuit 22, and the PC power supply circuit 22 applies a predetermined voltage (e.g., 5V) to the power supply control circuit 23, with the result that the power supply control circuit 23, which is used for the USB port, turns on (step S2).

When the power supply control circuit 23 turns on, power is supplied to at least one of the ports 1 and 2, to which an external device (USB device) is connected. The power supply control circuit 23 thus performs a normal operation (step S3).

The power supply control circuit 23 maintains the normal operation if the sum of currents flowing through the ports 1 and 2 (the sum of currents consumed by the external devices connected to the ports 1 and 2) does not exceed 1A+α (=500 mA+500 mA+α) (e.g., 1.2 A) (No in step S4). It issues a signal indicative of an overcurrent to the EC/KBC 20 or the embedded controller (EC) thereof if the sum exceeds 1A+α (Yes in step S4).

Thus, the embedded controller (EC) supplies the power supply control circuit 23 with an instruction signal to give an instruction to stop the supply of power to the USB interfaces (ports 1 and 2) upon receipt of the signal indicative of an overcurrent from the power supply control circuit 23. In response to the instruction signal, the power supply control circuit 23 turns off to stop the supply of power to the USB interfaces (ports 1 and 2) (step S5).

According to the present embodiment, the power supply control of a plurality of interface ports is performed by a single circuit, and the currents flowing through the interface ports are not controlled separately but the sum of currents consumed by the ports is controlled. The circuit arrangement can thus be simplified. Furthermore, the number of power supply control circuits for interfaces can be reduced and the packing area can be decreased. This feature is very effective in preventing the power supply control circuits from increasing in number to particularly support an external device that requires a great amount of power.

According to a control method adopted in the present embodiment, the sum of currents consumed by the respective ports does not exceed a predetermined value (e.g., 500 mA+500 mA+α). Therefore, when the number of ports in use is small (e.g., only one), the permissive range of currents consumed by the ports can be extended (e.g., 500 mA to 1A+α).

The present invention is not limited to the above-described embodiment. Various modifications can be made without departing from the scope of the subject matter of the present invention.

In the above embodiment, the electronic apparatus is a personal computer. However, a personal digital assistant can be used as the electronic apparatus.

In the above embodiment, the two interface ports conform to the USB standards. However, they can conform to the other interface standards such as IEEE1394 and PS/2. Moreover, the two interface ports can conform to different interface standards, respectively.

In the above embodiment, the number of interface ports is two. However, three or more interface ports can be used and, in this case, too, they can conform to different interface standards, respectively.

According to the present invention described in detail above, power supply control can efficiently be performed for a plurality of interfaces without increasing the number of power supply control circuits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
    a first interface to which a first device is connectable externally;
    a second interface to which a second device is connectable externally; and
    a power supply control circuit configured to control power to be supplied to the first and second interfaces without separately controlling respective currents flowing through the first and second interfaces, the power supply control circuit being configured to maintain a power supply to the first and second interfaces while a sum of power consumed by the first and second interfaces does not exceed a predetermined value and being configured to stop a power supply to the first and second interfaces when an overcurrent occurs in which a sum of power consumed by the first and second interfaces exceeds the predetermined value.

2. The electronic apparatus according to claim 1, wherein the first and second interfaces conform to a same interface standard.

3. The electronic apparatus according to claim 1, wherein the first and second interfaces conform to a different interface standard.

4. The electronic apparatus according to claim 1, wherein at least one of the first and second interfaces conforms to a USB (universal serial bus) standard.

5. The electronic apparatus according to claim 1, wherein at least one of the first and second interfaces conforms to an IEEE1394 standard.

6. An electronic apparatus, comprising:
    a first interface to which a first device is connectable externally;
    a second interface to which a second device is connectable externally;
    a power supply control circuit configured to control a current to be supplied to the first and second interfaces without separately controlling respective currents flowing through the first and second interfaces;
    a power supply circuit configured to generate a voltage to be supplied to the power supply control circuit;
    a power supply controller configured to supply/stop power to the power supply circuit; and
    a controller configured to instruct the power supply controller to supply/stop power in accordance with a power supply state of the electronic apparatus,
    wherein the power supply control circuit maintains a power supply to the first and second interfaces while a sum of power consumed by the first and second interfaces does not exceed a predetermined value,
    the power supply control circuit issues a signal indicative of an overcurrent to the controller when a sum of currents consumed by the first and second interfaces exceeds the predetermined value, and
    the controller supplies the power supply control circuit with a signal to give an instruction to stop a power supply to the first and second interfaces in response to the signal indicative of the overcurrent.

7. A power supply control method for an electronic apparatus including a first interface to which a first device is connectable and a second interface to which a second device is connectable, the method comprising:

supplying a current from a single power supply control circuit to the first and second interfaces;

controlling a current to be supplied to the first and second interfaces by the single power supply control circuit without separately controlling respective currents flowing through the first and second interfaces and maintaining a power supply to the first and second interfaces while a sum of power consumed by the first and second interfaces does not exceed a predetermined value; and stopping a power supply to the first and second interfaces when an overcurrent occurs in which a sum of currents consumed by the first and second interfaces exceeds the predetermined value.

8. The electronic apparatus according to claim 1, wherein when the second device is disconnected from the second interface while the first device is connected to the first interface, the power supply control circuit controls power to be supplied to the first interface as long as a current consumed by the first interface does not exceed the predetermined value.

9. The electronic apparatus according to claim 6, wherein when the second device is not connected to the second interface while the first device is connected to the first interface, the power supply control circuit controls power to be supplied to the first interface as long as a current consumed by the first interface does not exceed the predetermined value.

10. The method according to claim 7, further comprising controlling power to be supplied to the first interface, when the second device is not connected the second interface while the first device is connected to the first interface, as long as a current consumed by the first interface does not exceed the predetermined value.

* * * * *